(12) United States Patent
Choi

(10) Patent No.: US 7,609,250 B2
(45) Date of Patent: Oct. 27, 2009

(54) OPTICAL MODULE AND INPUT APPARATUS USING THE SAME

(75) Inventor: Oan-Kyu Choi, Suwon-si (KR)

(73) Assignee: ATLab Inc. (KR)

( * ) Notice: Subject to any disclaimer, the term of this patent is extended or adjusted under 35 U.S.C. 154(b) by 611 days.

(21) Appl. No.: 11/290,340

(22) Filed: Nov. 30, 2005

(65) Prior Publication Data

US 2006/0114232 A1    Jun. 1, 2006

(30) Foreign Application Priority Data

Nov. 30, 2004    (KR) ...................... 10-2004-0099566

(51) Int. Cl.
G09G 5/08    (2006.01)
(52) U.S. Cl. ...................... 345/163; 345/166
(58) Field of Classification Search ......... 345/156–166, 345/169, 174–176; 362/455; 380/312
See application file for complete search history.

(56) References Cited

U.S. PATENT DOCUMENTS

| | | | |
|---|---|---|---|
| 6,788,875 B1 | 9/2004 | Bidiville et al. | |
| 6,967,321 B2* | 11/2005 | Leong et al. | 250/239 |
| 7,131,751 B1* | 11/2006 | Theytaz et al. | 362/396 |
| 7,280,099 B2* | 10/2007 | Koay et al. | 345/163 |
| 2002/0035701 A1* | 3/2002 | Casebolt et al. | 713/300 |
| 2003/0142075 A1* | 7/2003 | Chin | 345/163 |
| 2006/0007148 A1* | 1/2006 | Theytaz et al. | 345/163 |

FOREIGN PATENT DOCUMENTS

| | | |
|---|---|---|
| CN | 2155620 Y | 2/1994 |
| EP | 1 465 048 A2 | 10/2004 |
| TW | 549490 | 8/2003 |
| TW | 590285 | 6/2004 |
| TW | 590286 | 6/2004 |

OTHER PUBLICATIONS

Taiwan Office Action and English translation; date: Oct. 26, 2006; Application No. 2005101258632. All references cited in the action are listed above.
Search Report for Patent Application No. 94141847; Date of Completion of the Search Report Aug. 21, 2007.

\* cited by examiner

*Primary Examiner*—Richard Hjerpe
*Assistant Examiner*—Mansour M Said
(74) *Attorney, Agent, or Firm*—Cantor Colburn LLP

(57) ABSTRACT

Provided are an optical module and an input apparatus having the same. The input apparatus includes the optical module having a circuit board provided with a light source and a sensor installed therein, a lens disposed at one side of the circuit board, and a support bracket disposed at the other side of the circuit board; and a main body having a through-hole at its one side and into which the lens of the optical module is inserted. Therefore, it is possible to uniformly maintain the height of the sensor for receiving light based on the thickness of the lens to maintain a certain depth of focus.

6 Claims, 7 Drawing Sheets

OPTICAL MODULE AND INPUT APPARATUS USING THE SAME

This U.S. nonprovisional patent application claims priority under 35 U.S.C. § 119 of Korean Patent Application 10-2004-0099566 filed on Nov. 30, 2004, the entire contents of which are hereby incorporated by reference.

BACKGROUND OF THE INVENTION

1. Field of the Invention

The present invention relates to an optical module and an input apparatus using the same and, more particularly, to an optical module movable on a display in response to a user's instruction and an input apparatus using the same.

2. Description of Related Art

In general, an input apparatus using an optical module is widely being used in various applications, e.g., handheld terminals such as a cellular phone and a personal digital assistant (PDA), a remote controller, an optical mouse for a computer, and so on.

The optical mouse among the above input apparatuses is a peripheral device of the computer for indicating a desired position using a cursor displayed on a screen. Here, the optical mouse includes an optical module for detecting a moved position of the optical mouse using reflection of light radiated from a light source.

Hereinafter, a process of detecting a moved state of an optical mouse using an optical module will be described with reference to FIG. 1.

The optical mouse using an optical module detects movement of an x-axis and/or a y-axis using reflection of light radiated from a light source 12, for example, a light emitting diode. That is, the light radiated from the light source 12 is reflected by a subject 15, for example, a flat surface at which the optical mouse is positioned. Then, the light reflected from the subject 15 is collected through a lens 20 installed in the optical mouse and is received into a sensor 14.

As described above, the sensor 14 receiving the light radiated from the light source 12 and reflected from the subject 15 detects x and y-axis movement of the optical mouse using variation of the light received therein, and outputs a predetermined signal corresponding to the movement to transmit the signal to a micro control unit (MCU) 40. Then, the signal output as described above is transmitted to a computer 50 together with data input by a button 45.

In addition, as shown in FIG. 2, the conventional optical mouse for detecting movement of the optical mouse through the above processes includes a base plate 30, and an optical module disposed on the base plate 30 to detect movement of the optical mouse. In this process, the optical module includes a lens 20 installed at an upper surface of the base plate 30, and a circuit board 10 disposed on the lens 20 and having a sensor 14 and a light source 12 installed therein. Here, a sensor 14 and a MCU can be integrated into a single die.

Meanwhile, in the process of assembling the conventional optical mouse, the optical module, i.e., the circuit board 10 having the sensor 14 and the light source 12 installed therein and the lens 20 are separately assembled to each other, and then the optical module is separately assembled to the base plate 30. As described above, when the separately assembled optical module and base plate 30 are assembled to each other, tolerance may occur.

For example, although the base plate 30 is formed using the same mold to have a thickness of 2.4±0.2 mm, the formed base plate 30 may be finely deformed due to heat treatment, material characteristics and so on. Then, when the lens is disposed on an upper surface of the deformed base plate and the circuit board is disposed on the lens, it is difficult to obtain flatness or uniform height required by the sensor installed in the circuit board.

Therefore, it is difficult for the separately fabricated optical mouse to have a certain depth of focus (DOF) due to the tolerance occurred when the circuit board, the lens and the base plate are assembled to each other. In this process, the above problems may be similarly applied to all kinds of input apparatuses using the optical module, e.g., handheld terminals, remote controllers, and so on.

As a result, it is impossible for the sensor of the conventional optical mouse to have a certain depth of focus since it is difficult to maintain mechanical dimensions uniformly, so that each mouse cannot precisely detect movement of the optical mouse.

SUMMARY OF THE INVENTION

Therefore, to solve the problem described hereinabove, an object of the present invention is to provide an optical module having a certain depth of focus in spite of occurrence of tolerance in assembling and an input apparatus using the same.

An optical module in accordance with a first aspect of the present invention include: a circuit board in which a light source for radiating light and exposing an object and a sensor for receiving a reflected light from the object and calculation movement of the object by comparing the reflected light in time sequence are installed, a lens disposed at one side of the circuit board to image the light radiated from the light source and reflected by a subject and then to transmit the imaged light to the sensor, and a support bracket disposed at the other side of the circuit board.

In this process, an elastic means may be installed between the circuit board and the support bracket.

An optical mouse in accordance with a second aspect of the present invention include: a base plate having a through-hole formed at its one side; and an optical module having a circuit board in which a light source for radiating light and a sensor for receiving the light are installed, a lens disposed at one side of the circuit board and inserted into the through-hole, and a support bracket disposed at the other side of the circuit board.

An elastic means may be installed between the circuit board and the support bracket.

The optical module may further comprises a fixing means including a first hooking projection formed at the base plate, a second hooking projection formed at the support bracket and engaged with the first hooking projection, a fixing protrusion formed at the lens, and a fixing end formed at the base plate and contacting the fixing protrusion.

An anti-slip foot may be installed at a lower part of the lens to reduce friction of the lens inserted into the through-hole and contacting a bottom surface.

A handheld terminal in accordance with a third aspect of the present invention include: a case having a through-hole at its one side; and an optical module having a circuit board in which a light source for radiating light and a sensor for receiving the light are installed, a lens disposed at one side of the circuit board and inserted into the through-hole, and a support bracket disposed at the other side of the circuit board.

An elastic means may be installed between the circuit board and the support bracket.

The optical module may further comprises a fixing means including a first hooking projection formed at the case, a second hooking projection formed at the support bracket and engaged with the first hooking projection, a fixing protrusion formed at the lens, and a fixing end formed at the case and contacting the fixing protrusion.

A remote controller in accordance with a fourth aspect of the present invention include: a case having a through-hole at its one side; and an optical module having a circuit board in which a light source for irradiating light and a sensor for receiving the light are installed, a lens disposed at one side of the circuit board and inserted into the through-hole, and a support bracket disposed at the other side of the circuit board.

An elastic means may be installed between the circuit board and the support bracket.

The optical module may further comprises a fixing means including a first hooking projection formed at the case, a second hooking projection formed at the support bracket and engaged with the first hooking projection, a fixing protrusion formed at the lens, and a fixing end formed at the case and contacting the fixing protrusion.

BRIEF DESCRIPTION OF THE DRAWINGS

The foregoing and other objects, features and advantages of the invention will be apparent from the more particular description of a preferred embodiment of the invention, as illustrated in the accompanying drawing. The drawing is not necessarily to scale, emphasis instead being placed upon illustrating the principles of the invention.

DETAILED DESCRIPTION OF THE INVENTION

Hereinafter, the detailed description of a preferred embodiment in accordance with the present invention will be apparent in connection with the accompanying drawings.

Figure 1:
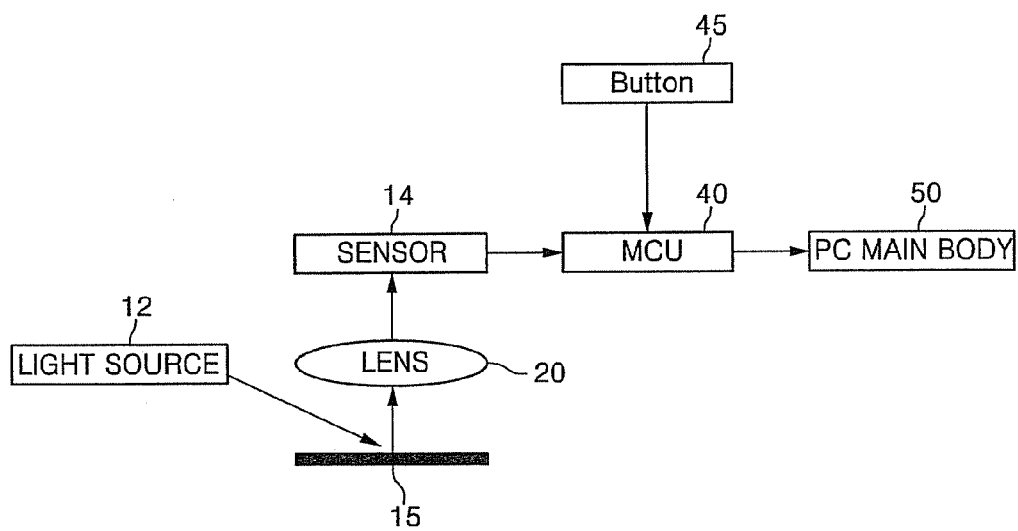
FIG. 1 is a block diagram of a conventional optical mouse using an optical module.
Figure 2:
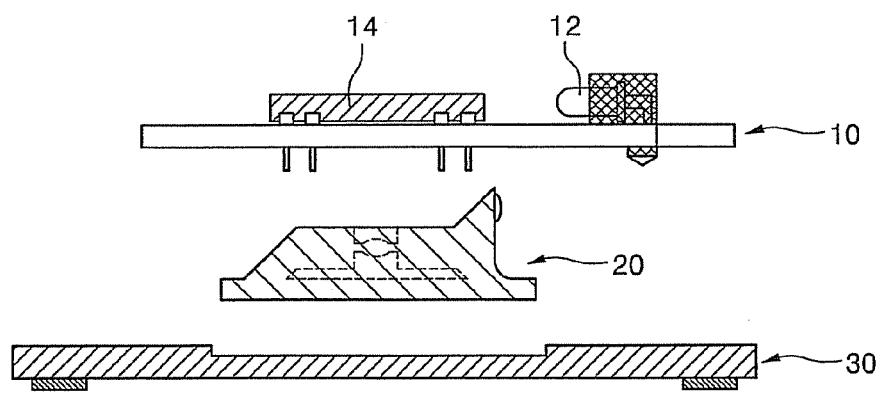
FIG. 2 is a schematic cross-sectional view of the conventional optical mouse.
Figure 3:
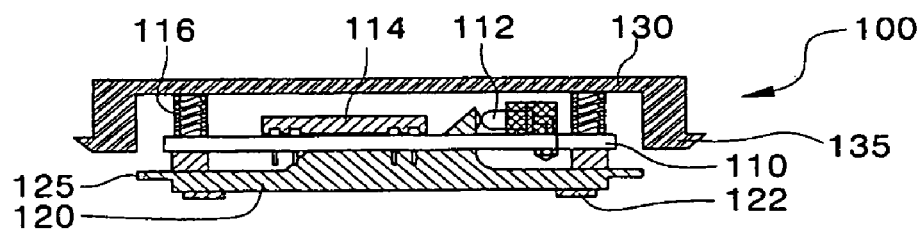
FIG. 3 is a schematic cross-sectional view of an optical module in accordance with the present invention.

FIG. 3 is a schematic cross-sectional view of an optical module in accordance with the present invention.

Referring to FIG. 3, an optical module 100 includes a circuit board 110, a lens 120 disposed at one surface of the circuit board 110, and a support bracket 130 disposed at the other surface of the circuit board 110.

The circuit board 110 includes a light source 112 for radiating light and a sensor 114 for receiving the light radiated from the light source 112 and reflected by a subject, which are installed therein.

The lens 120 images the light radiated from the light source 112 and reflected by the subject, before received into the sensor 114, and transmits the imaged light to the sensor 114.

In addition, the support bracket 130 functions to uniformly maintain the height of the sensor 114. Here, an elastic means such as, a spring 116 is installed between the support bracket 130 and the circuit board 110. The spring 116 resiliently biases the lens 120 so that the lens 120 is always in contact with the subject at its one surface.

Figure 4:
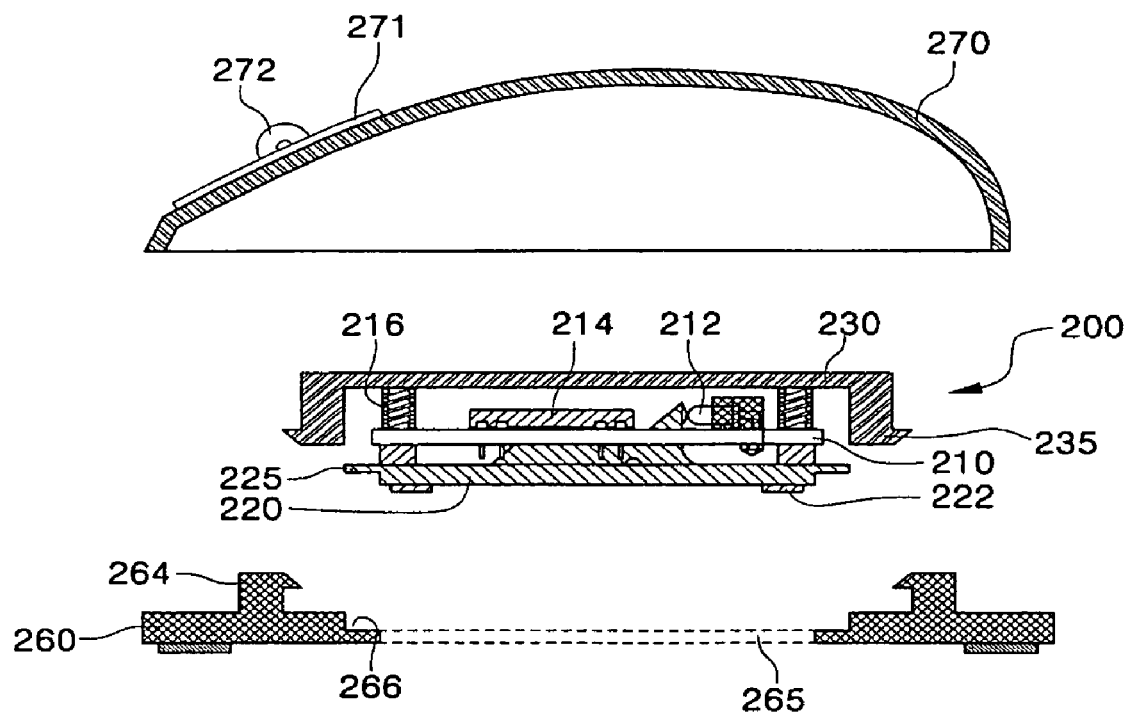
FIG. 4 is an exploded cross-sectional view of the optical mouse in accordance with the present invention.
Figure 5:
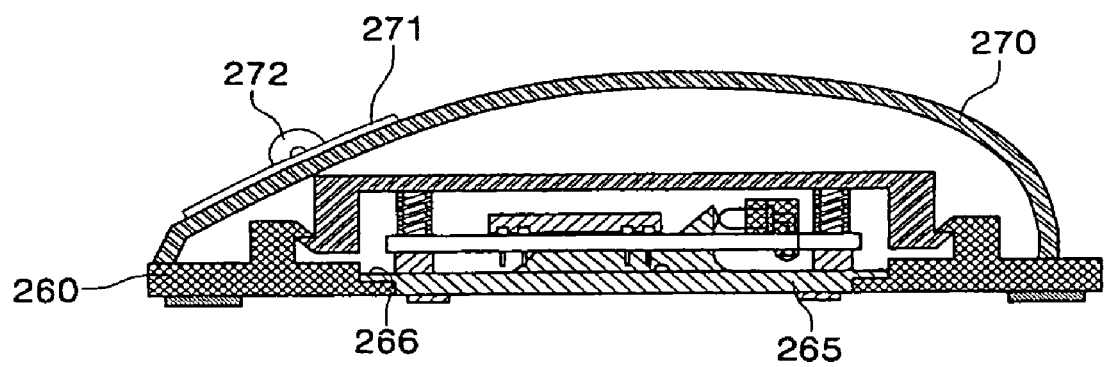
FIG. 5 is a schematic cross-sectional view of the optical mouse in accordance with the present invention.

Meanwhile, FIG. 4 is an exploded cross-sectional view of an optical mouse in accordance with the present invention, and FIG. 5 is a schematic cross-sectional view of the optical mouse in accordance with the present invention.

Referring to FIGS. 4 and 5, an optical mouse includes a base plate 260 having a through-hole 265 at its one side, a cover 270 engaged with the base plate 260 and provided with a button 271 and a wheel 272 as an input means, and an optical module 200 disposed in a space defined by the base plate 260 and the cover 270 engaged with each other.

In this process, the optical module 200 includes a circuit board 210, a lens 220 disposed at one surface of the circuit board 210, and a support bracket 230 disposed at the other surface of the circuit board 210.

The circuit board 210 includes a light source 212 for radiating light and a sensor 214 for receiving the light radiated from the light source 212 and reflected by a subject, which are installed therein. In addition, the lens 220 images the light radiated from the light source 212 and reflected from the subject, i.e., a flat surface (not shown), and transmits the imaged light to the sensor 214. In this process, an elastic means, such as, a spring 216 is installed between the support bracket 230 and the circuit board 210.

Meanwhile, the optical mouse includes a fixing means for inserting the lens 220 into the through-hole 265 of the base plate 260 to be in contact with the subject and preventing the lens 220 from separating from the base plate 260.

The fixing means includes a first hooking projection 264 projecting from one side of an upper surface of the base plate 260, a fixing end 266 formed at an inner surface of the base plate 260, a second hooking projection 235 formed at one side of the support bracket 230, and a fixing protrusion 225 formed at one side of the lens 220.

At this time, the first hooking projection 264 formed at the base plate 260 and the second hooking projection 235 formed at the support bracket 230 are fastened to each other when the base plate 260 and the optical module 200 are engaged with each other to prevent the lens 220 in contact with the subject from separating from the base plate 260 into the optical mouse.

In addition, the fixing protrusion 225 formed at the lens 220 is in contact with the fixing end 266 formed at the base plate 260 when the base plate 260 and the optical module 200 are engaged with each other to prevent the lens 220 from separating from the base plate 260 to the exterior.

Further, an anti-slip foot 222 may be installed on a lower surface of the lens 220 in contact with the bottom surface to reduce friction between the module 200 and the subject.

Figure 6:
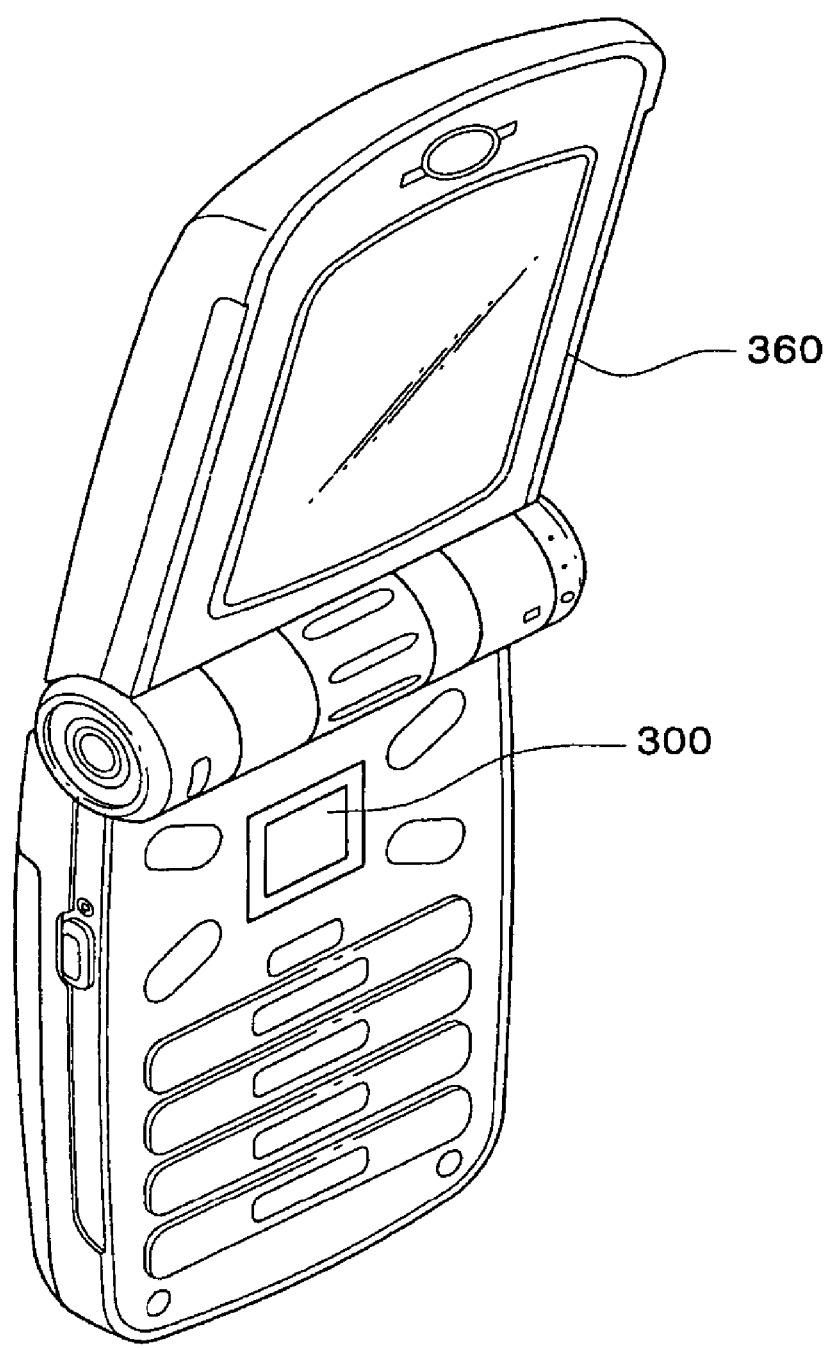
FIG. 6 is a perspective view of a handheld terminal in accordance with the present invention.
Figure 7:
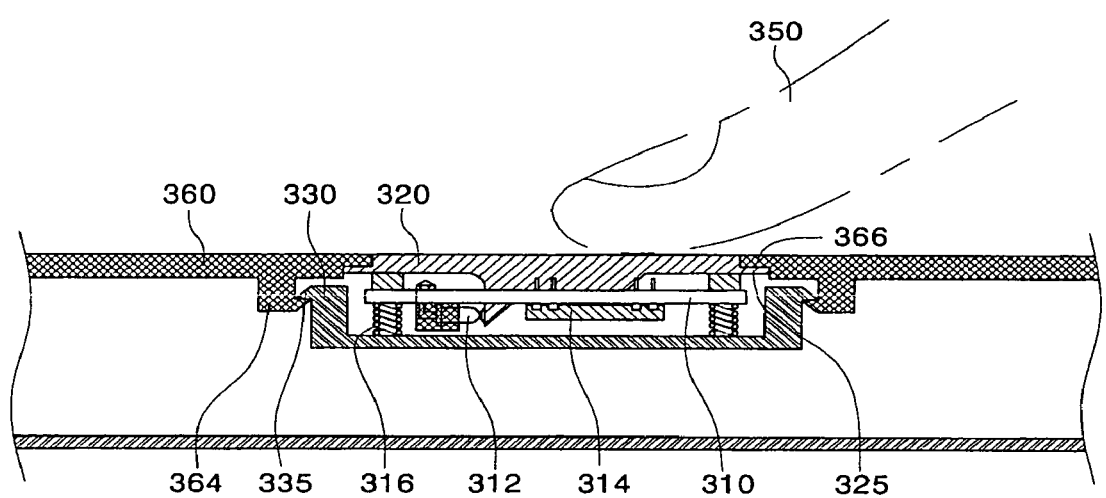
FIG. 7 is a schematic cross-sectional view of the handheld terminal in accordance with the present invention.

FIG. 6 is a perspective view of a handheld terminal in accordance with the present invention, and FIG. 7 is a schematic cross-sectional view of the handheld terminal in accordance with the present invention.

Referring to FIGS. 6 and 7, an optical module 300 mounted in a case 360 of the handheld terminal also includes a circuit board 310 formed in the case 360, a lens 320 disposed at one side of the circuit board 310, and a support bracket 330 disposed at the other side of the circuit board 310, similarly to the optical module 200 installed in the optical mouse.

At this time, the optical module 300 of the handheld terminal is inserted into an upper surface of the case 360, different from the optical module 200 of the optical mouse. That is, the optical module 300 detects movement of a subject, such as, a user's finger, using reflection of the light radiated from the light source 312.

Meanwhile, an elastic means, such as, a spring 316 is installed between the support bracket 330 and the circuit board 310. In addition, the optical module 300 includes a fixing means for preventing the lens 320 from separating from the case 360. Here, the fixing means includes a first hooking projection 335 formed at the support bracket 330, a second hooking projection 364 formed at one side of the case 360 to be engaged with the first hooking projection 335, a fixing protrusion 325 formed at one side of the lens 320, and a fixing end 366 formed at the case 360 to be in contact with the fixing protrusion 325.

That is, the lens 320 is fixed to the case 360 by the first and second hooking projections 335 and 364, the fixing protrusion 325, and the fixing end 366. Simultaneously, the lens 320 is supported by the resilient force of the spring 316.

Figure 8:
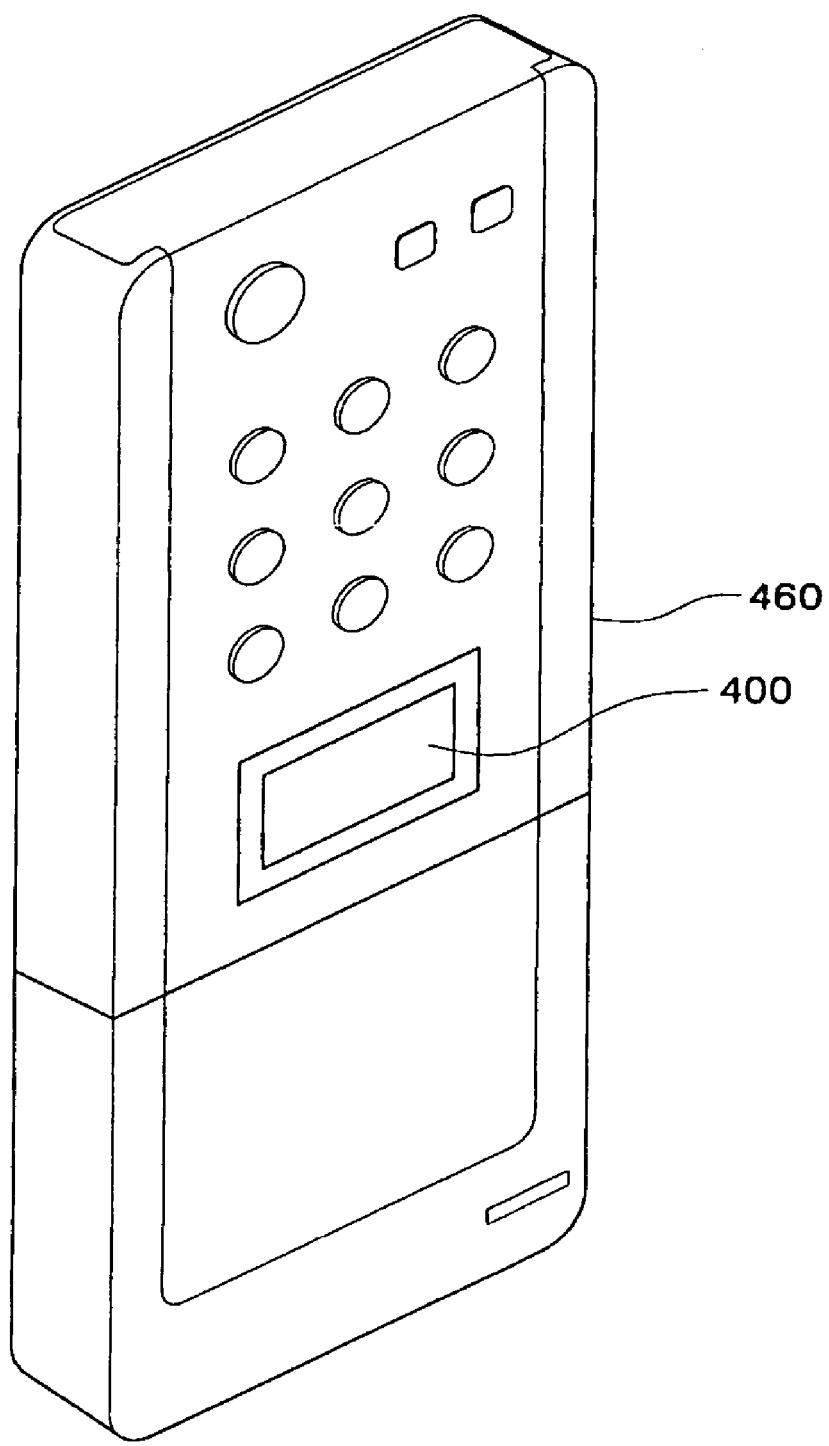
FIG. 8 is a schematic perspective view of a remote controller in accordance with the present invention.
Figure 9:
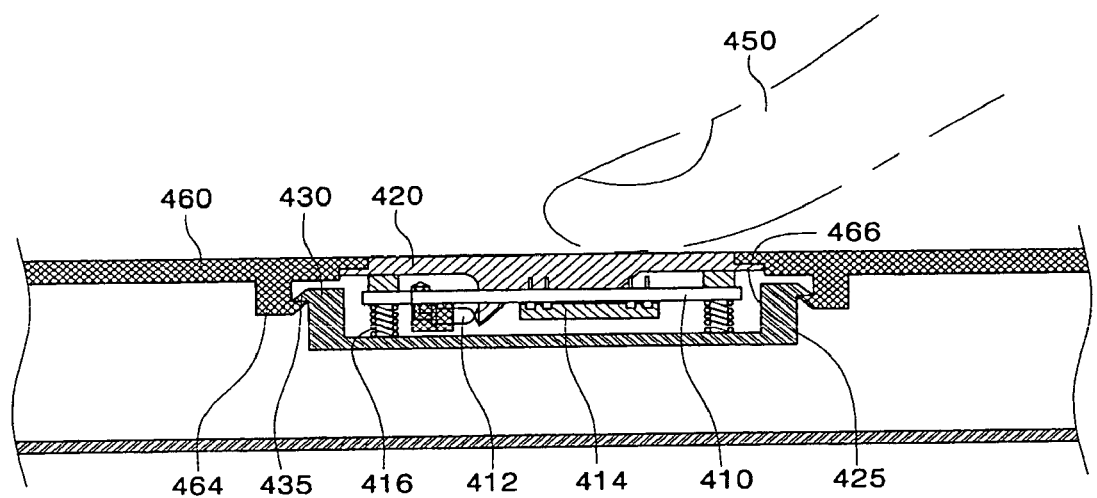
FIG. 9 is a schematic cross-sectional view of the remote controller in accordance with the present invention.

Meanwhile, FIG. 8 is a schematic perspective view of a remote controller in accordance with the present invention, and FIG. 9 is a schematic cross-sectional view of the remote controller in accordance with the present invention.

Another embodiment of the present invention relates to a remote controller provided with an optical module for moving a cursor on a screen and selecting a desired function to provide interactive control of electronic appliances such as audio, video, computer, and home network controller.

Referring to FIGS. 8 and 9, an optical module 400 installed in a case 460 of the remote controller also includes a circuit board 410 formed in the case 460, a lens 420 disposed at one side of the circuit board 410, and a support bracket 430 disposed at the other side of the circuit board 410, similarly to the optical module 200 installed in the optical mouse.

At this time, the optical module 400 of the remote controller is inserted into an upper surface of the case 460, similarly to the optical module 300 of the handheld terminal so that the optical module 400 detects movement of a subject, such as a user's finger, using reflection of the light radiated from the light source 412.

Meanwhile, the remote controller uniformly maintains a position of the lens 420 using a spring 416, which is installed between the circuit board 410 and the support bracket 430, and a fixing means when the optical module 400 and the case 460 are engaged with each other.

Hereinafter, the operation and effect of the optical module and the input apparatus using the same in accordance with the present invention will be described in conjunction with the accompanying drawings.

In order to assemble an optical mouse, an operator fixes a lens 220 at one side of a circuit board 210 having a light source 212 and a sensor 214 installed therein. Then, a support bracket 230 is engaged with the other side of the circuit board 210. At this time, a spring 216 is installed between the circuit board 210 and the support bracket 230. As described above, the circuit board 210, the lens 220 and the support bracket 230 are engaged with one another to complete an optical module 200.

Next, the lens 220 of the completed optical module 200 is inserted into a through-hole 265 formed at one side of the base plate 260. Simultaneously, a first hooking projection 235 formed at the support bracket 230 is engaged with a second hooking projection 264 formed at the base plate 260, and a fixing protrusion formed at one side of the lens 220 is in contact with a fixing end 266 formed at one side of the base plate 260, thereby making the lens 220 in direct contact with a subject.

Therefore, the height of the sensor 214 mounted in the circuit board 210 can be uniformly maintained, since the sensor 214 is supported on the base plate 260 by a fixing means and the lens 220 is movable up and down by the resilient force of the spring 216 installed in the optical module 200, although the components have different tolerances.

As a result, although various dimensions of base plates 260 are used, i.e., they have different tolerances, it is possible to maintain a certain depth of focus (DOF) and detect movement of the optical mouse by locating the sensor 214 at the same height.

While the assembling process of the optical mouse is described as an example, other embodiments such as a handheld terminal, a remote controller and so on having the optical module are also assembled by the same process.

As can be seen from the foregoing, the optical module and the input apparatus having the same in accordance with the present invention are capable of fixing the height of the sensor as a thickness of the lens to maintain a certain depth of focus, although the tolerance is occurred when the input apparatus is assembled, by closely contacting the lens to the subject using the spring and the fixing means of the optical module. Here, the spring can be replaced with one other elastic or tensile means.

While this invention has been described in connection with what is presently considered to be the most practical and preferred embodiment, it is to be understood that the invention is not limited to the disclosed embodiment, but on the contrary, it is intended to cover various modification within the spirit and the scope of the Invention, which is set forth in the appended claims.

What is claimed is:

1. An optical module comprising:
    a circuit board in which a light source for radiating light and exposing an object and a sensor for receiving a reflected light from the object and calculating movement of the object by comparing the reflected light in time sequence are installed;
    a lens disposed at one side of the circuit board to image the light radiated from the light source and reflected by a subject and then to transmit the imaged light to the sensor;
    a support bracket disposed at the other side of the circuit board; and
    a spring installed between the circuit board and the support bracket and elastically pressing the lens such that a lower surface of the lens is in direct contact with the object.

2. The optical module according to claim 1, wherein the light source and the sensor are installed between the circuit board and the support bracket.

3. An optical mouse comprising:
    a base plate having a through-hole formed at its one side;
    an optical module having a circuit board in which a light source for radiating light and a sensor for receiving the light are installed, a lens disposed at one side of the circuit board to image the light radiated from the light source and reflected by an object and then transmit the imaged light to the sensor, and inserted into the through-hole, and a support bracket disposed at the other side of the circuit board; and
    a spring installed between the circuit board and the support bracket and elastically pressing the lens such that a lower surface of the lens is in direct contact with the object.

4. The optical mouse according to claim 3, wherein the light source and the sensor are installed between the circuit board and the support bracket.

5. The optical mouse according to claim 3, wherein the optical module further comprises a fixing means including a first hooking projection formed at the base plate, a second hooking projection formed at the support bracket and engaged with the first hooking projection, a fixing protrusion formed at the lens, and a fixing end formed at the base plate and contacting the fixing protrusion.

6. The optical mouse according to claim 3, wherein an anti-slip foot is installed at a lower part of the lens to reduce friction of the lens inserted into the through-hole and contacting a bottom surface.

* * * * *